US010267522B2

(12) United States Patent
Ciani et al.

(10) Patent No.: US 10,267,522 B2
(45) Date of Patent: *Apr. 23, 2019

(54) BURNER FOR A COMBUSTION CHAMBER OF A GAS TURBINE HAVING A MIXING AND INJECTION DEVICE

(71) Applicant: ANSALDO ENERGIA SWITZERLAND AG, Baden (CH)

(72) Inventors: Andrea Ciani, Zürich (CH); John Philip Wood, Rütihof (CH); Douglas Anthony Pennell, Windisch (CH); Ewald Freitag, Baden (CH); Urs Benz, Gipf-Oberfrick (CH); Andre Theuer, Baden (CH)

(73) Assignee: ANSALDO ENERGIA SWITZERLAND AG, Baden (CH)

( * ) Notice: Subject to any disclaimer, the term of this patent is extended or adjusted under 35 U.S.C. 154(b) by 705 days.

This patent is subject to a terminal disclaimer.

(21) Appl. No.: 14/060,931

(22) Filed: Oct. 23, 2013

(65) Prior Publication Data

US 2014/0109588 A1    Apr. 24, 2014

(30) Foreign Application Priority Data

Oct. 23, 2012 (EP) .................................... 12189606

(51) Int. Cl.
*F23R 3/16* (2006.01)
*F23R 3/28* (2006.01)
(Continued)

(52) U.S. Cl.
CPC .................. *F23R 3/16* (2013.01); *F02C 9/26* (2013.01); *F02C 9/32* (2013.01); *F02C 9/34* (2013.01);
(Continued)

(58) Field of Classification Search
CPC ...... F23R 3/16; F23R 3/18; F23R 3/20; F23R 3/286; F23R 3/34; F23R 3/346; F23R 2900/03341; F02C 6/02; F02C 6/003
See application file for complete search history.

(56) References Cited

U.S. PATENT DOCUMENTS 4,786,016 A * 11/1988 Presz, Jr. et al.
4,932,861 A *  6/1990 Keller et al.
(Continued)

FOREIGN PATENT DOCUMENTS

CN       1059398 A  *  3/1992
DE   195 49 143 A1  *  7/1997
(Continued)

OTHER PUBLICATIONS

Office Action (Final Notification of Reasons for Refusal) dated Apr. 6, 2015, by the Japanese Patent Office in corresponding Japanese Patent Application No. 2013-219566, and an English translation of the Office Action. (6 pages).*

(Continued)

*Primary Examiner* — Scott J Walthour
(74) *Attorney, Agent, or Firm* — Buchanan Ingersoll & Rooney PC

(57) ABSTRACT

The present invention relation to a burner for a combustion chamber of a gas turbine with a mixing and injection device. The mixing and injection device includes a limiting wall that defines a gas-flow channel and at least two streamlined bodies, each extending in a first transverse direction into the gas-flow channel. Each streamlined body has two lateral surfaces that are arranged essentially parallel to the main-flow direction, the lateral surfaces being joined to one another at their upstream side to form a leading edge of the body and joined at their downstream side to form a trailing edge of the body. Each streamlined body has a cross-section perpendicular to the first transverse direction that is shaped (Continued)

as a streamlined profile. At least one of the streamlined bodies is provided with a mixing structure and with at least one fuel nozzle located at its trailing edge for introducing at least one fuel essentially parallel to the main-flow direction into the flow channel, wherein at least two of the streamlined bodies have different lengths along the first transverse direction such that they may be used for a can combustor. The invention also relates to a method of using said burner in a gas turbine.

24 Claims, 5 Drawing Sheets

(51) Int. Cl.
  *F02C 9/32* (2006.01)
  *F02C 9/34* (2006.01)
  *F02C 9/26* (2006.01)
  *F23R 3/20* (2006.01)
  *F23R 3/46* (2006.01)
  *F23R 3/34* (2006.01)
  *F23R 3/36* (2006.01)
  *F02C 6/00* (2006.01)

(52) U.S. Cl.
  CPC ............... *F23R 3/20* (2013.01); *F23R 3/286* (2013.01); *F23R 3/34* (2013.01); *F23R 3/346* (2013.01); *F23R 3/36* (2013.01); *F23R 3/46* (2013.01); *F02C 6/003* (2013.01); *F05B 2260/222* (2013.01); *F23R 2900/03341* (2013.01)

(56) References Cited

U.S. PATENT DOCUMENTS

| | | | | |
|---|---|---|---|---|
| 5,010,453 | A | * | 4/1991 | Ketterman |
| 5,431,018 | A | * | 7/1995 | Keller |
| 5,626,017 | A | * | 5/1997 | Sattelmayer |
| 5,839,283 | A | * | 11/1998 | Dobbeling |
| 5,941,064 | A | * | 8/1999 | Chevalier et al. |
| 6,155,820 | A | * | 12/2000 | Dobbeling |
| 8,490,398 | B2 | * | 7/2013 | Poyyapakkam et al. |
| 8,938,971 | B2 | * | 1/2015 | Poyyapakkam et al. |
| 2011/0030375 | A1 | * | 2/2011 | Bunker ............... F23D 14/64 60/742 |
| 2012/0285172 | A1 | * | 11/2012 | Poyyapakkam et al. |
| 2012/0297787 | A1 | * | 11/2012 | Poyyapakkam et al. |
| 2014/0033728 | A1 | * | 2/2014 | Marmilic ............... F02C 7/141 60/772 |

FOREIGN PATENT DOCUMENTS

| | | | |
|---|---|---|---|
| DE | 103 12 971 | * | 12/2004 |
| EP | 0 245 190 A2 | * | 11/1987 |
| EP | 0 473 371 | * | 3/1992 |
| EP | 1 257 809 | * | 11/2002 |
| EP | 2 522 912 A1 | * | 11/2012 |
| JP | 11-223306 A | * | 8/1999 |
| JP | 3930598 B2 | * | 6/2007 |
| WO | 2011/054757 | * | 5/2011 |
| WO | 2011/054760 | * | 5/2011 |
| WO | 2011/054766 | * | 5/2011 |
| WO | 2011/054771 A2 | * | 5/2011 |
| WO | 2012/136787 | * | 10/2012 |

OTHER PUBLICATIONS

The extended European Search Report dated May 24, 2017, by the European Patent Office in corresponding European Patent Application No. 16207654.1-1602. (10 pages)*

The extended European Search Report dated May 26, 2017, by the European Patent Office in corresponding European Patent Application No. 16207652.5-1602. (10 pages)*

* cited by examiner

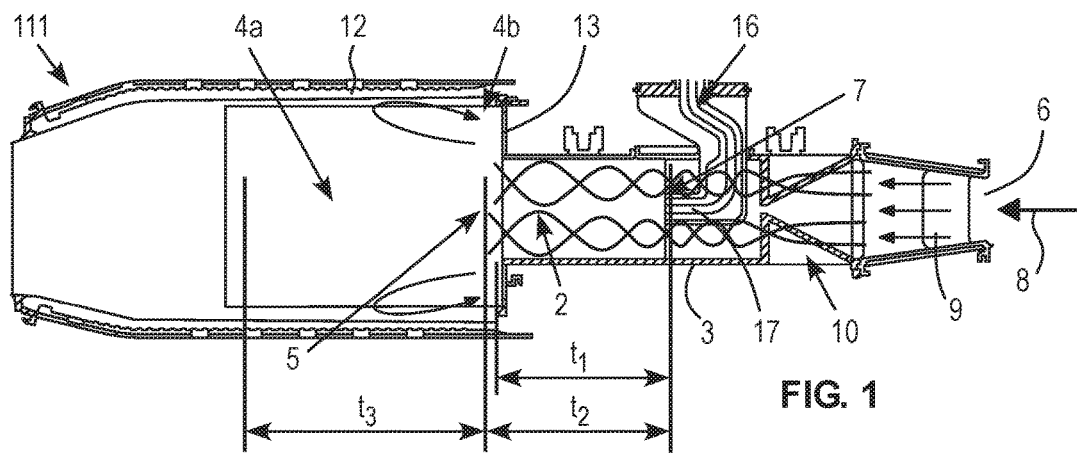
FIG. 1
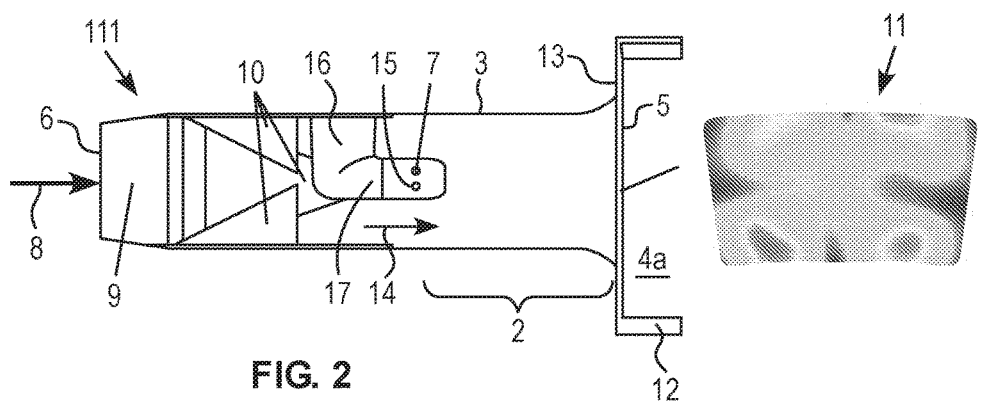
FIG. 2
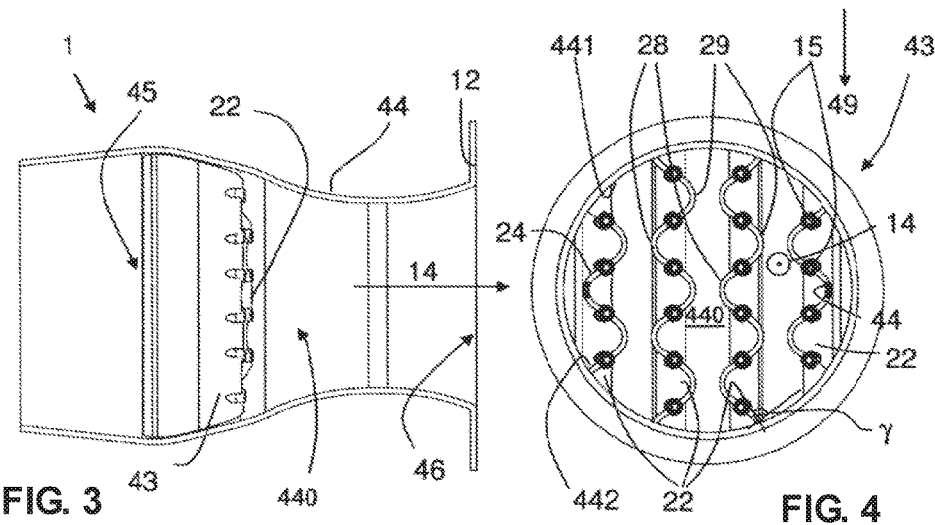
FIG. 3
FIG. 4

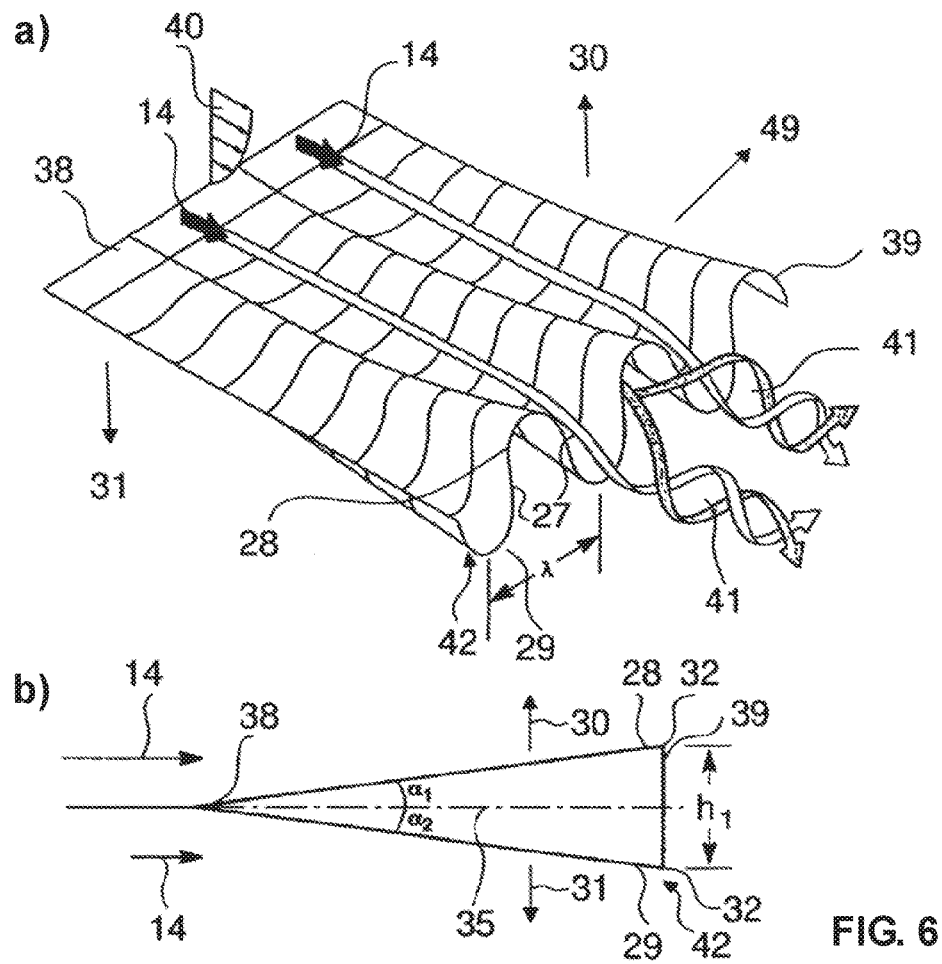
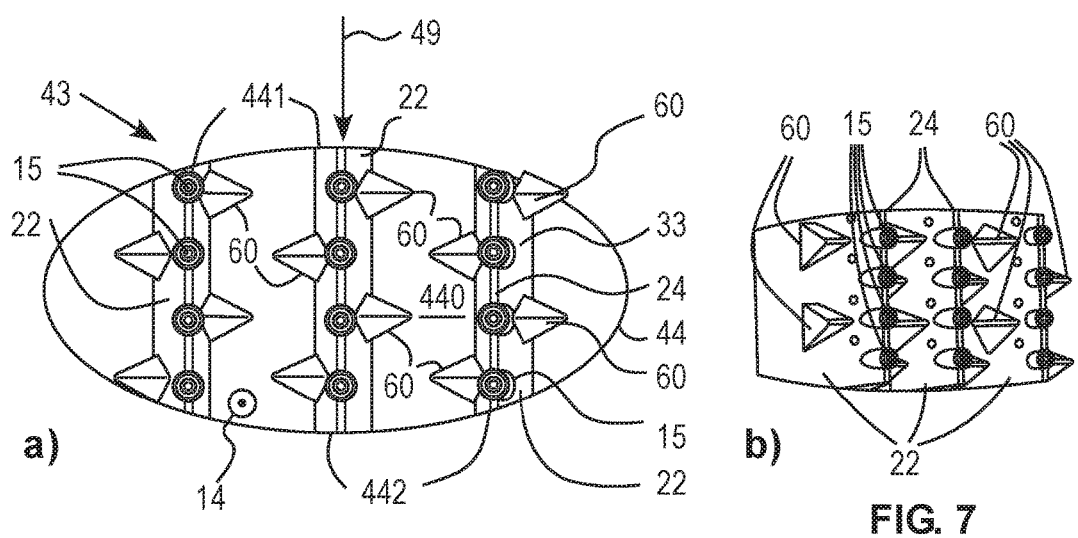
FIG. 7

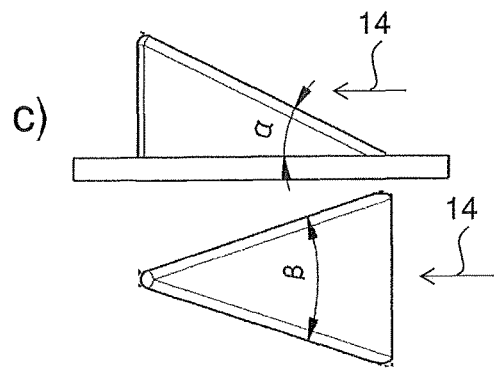
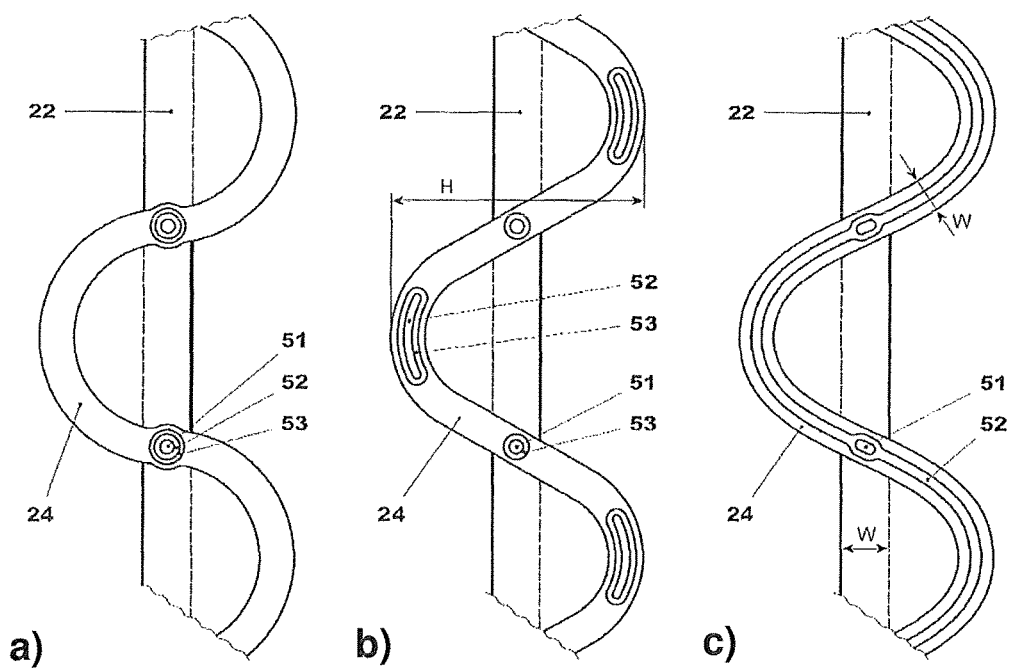
FIG. 7
FIG. 8

BURNER FOR A COMBUSTION CHAMBER OF A GAS TURBINE HAVING A MIXING AND INJECTION DEVICE

CROSS-REFERENCE TO RELATED APPLICATIONS

This application claims priority to European application 12189606.2 filed Oct. 23, 2012, the contents of which are hereby incorporated in its entirety.

TECHNICAL FIELD

The present invention relates to a burner for a gas turbine with a convexly curved, preferably a cylindrical combustion chamber, the burner comprising a combined mixing and injection device.

BACKGROUND

Mixing devices are essential parts of environmentally friendly burners for gas turbines. They mix continuous-flow streams of a fuel with an oxidizing fluid, like air, in a burner for premixed combustion in a subsequent combustion chamber. In modern gas turbines good mixing of fuel and oxidizing fluid is a prerequisite for complete combustion with low emissions. Optimization of mixing devices aims at reducing the energy required to obtain a specified degree of homogeneity. In continuous-flow mixing processes the pressure drop over a mixing device is a measure for the energy cost of the mixing procedure. Furthermore, the time and space required to obtain the specified degree of homogeneity are important parameters for evaluating mixing devices or mixing elements.

A high turbine inlet temperature enhances the efficiency in standard gas turbines. As a consequence of high inlet temperatures, there arise high nitric oxide emission levels and higher life cycle costs. These problems can be mitigated with a sequential combustion cycle, wherein the compressor delivers nearly double the pressure ratio of a conventional one. The main flow passes the first combustion chamber (e.g. using a burner of the general type as disclosed in EP 1 257 809 or as in U.S. Pat. No. 4,932,861, also called "EV" combustor, where the EV stands for EnVironmental), wherein a part of the fuel is combusted. After expanding at the high-pressure turbine stage, more fuel is added and combusted (e.g. using a burner of the type as disclosed in U.S. Pat. Nos. 5,431,018 or 5,626,017 or in US 2002/0187448, also called SEV combustor, where the "S" stands for sequential). Both combustors contain premixing burners, as low nitric oxide emissions further require high mixing quality of the fuel and the oxidizer.

Since the second combustor is fed by the expanded exhaust gas of the first combustor, the operating conditions allow self-ignition (spontaneous ignition or auto ignition) of the fuel air mixture without additional energy being supplied to the mixture. To prevent ignition of the fuel air mixture in the mixing region, the residence time therein must not exceed the self-ignition delay time. This criterion ensures flame-free zones inside the burner. This criterion poses, however, challenges in obtaining appropriate distribution of the fuel across the burner exit area. SEV-burners are currently only designed for operation on natural gas and oil. Therefore, the momentum flux of the fuel is adjusted relative to the momentum flux of the main flow so as to penetrate in to the vortices. This is done by using air from the last compressor stage (high-pressure carrier air). The high-pressure carrier air is bypassing the high-pressure turbine. The subsequent mixing of the fuel and the oxidizer at the exit of the mixing zone is just sufficient to allow low nitric oxide emissions (mixing quality) and avoid flashback (residence time), which may be caused by auto ignition of the fuel air mixture in the mixing zone.

Upscaling of the known SEV geometry as currently used for gas turbines like Alstom's GT24 or GT26 to fit can combustors with cylindrical geometry cannot be done without further adaptations since residence time and fluid dynamic structures cannot be maintained at the same time, i.e. known SEV-concepts, as described above, are not working for can combustor.

WO 2011/054760 and WO 2011/054766 describe gas-turbine burners with combined mixing and injection devices for burners with annular or rectangular cross-sections.

SUMMARY

It is an object of the present invention to provide a burner for a substantially cylindrical combustor, e.g. a can combustor, which causes a low gas-pressure drop while providing for a homogeneous mixing of fuel and gas. Such a burner is particularly advantageous for high reactivity conditions, i.e. for a situation where the inlet temperature of a burner is high, and/or for a situation where high reactivity fuels, particularly fuels with high hydrogen components or MBtu fuels, shall be burned.

Here, a burner with a specific geometry and a combined mixing and injection device is proposed, which produces only a minimum pressure drop when mixing gas, e.g. air, and fuel to a mixture with a high homogeneity. The specific can geometry helps in avoiding low velocity pockets. This burner is proposed to increase the efficiency of a gas turbine engine with an essentially non-rectangular shaped combustion chamber, e.g. a can combustor. Moreover, the burner according to invention is intended to increase fuel capability and to simplify the design.

These and other objectives are achieved by providing a burner for a combustion chamber of a gas turbine with a mixing and injection device, wherein the mixing and injection device is comprising:
- a limiting wall that defines a gas-flow channel with a longitudinal axis, an inlet area, and, downstream thereof in a main-flow direction, an outlet area;
- at least two streamlined bodies, each extending in a first transverse direction from a first region of the limiting wall perpendicularly or at an inclination with respect to the main-flow direction into the gas-flow channel;
- each streamlined body having two lateral surfaces that are arranged essentially parallel to the main-flow direction with a central plane therebetween, the lateral surfaces being joined to one another at their upstream side to form a leading edge of the body and joined at their downstream side to form a trailing edge of the body;
- each streamlined body having a cross-section perpendicular to the first transverse direction that is shaped as a streamlined profile;
- wherein at least one of said streamlined bodies is provided with a mixing structure and with at least one fuel nozzle located at its trailing edge for introducing at least one fuel essentially parallel to the main-flow direction into the flow channel,
- wherein the burner comprises at least two of the streamlined bodies with different lengths along the first transverse direction.

In particular, the streamlined bodies extend over different lengths along the first transverse direction through the main flow-channel. This is the length meant, if the text below refers to the length of the body in the first transverse direction and the context does not conflict with this interpretation. The first transverse direction is the lengthwise direction of the streamlined body along which it extends into the gas-flow channel.

According to a preferred embodiment, the limiting wall defines a gas-flow channel with a cross-section that is substantially convexly curved, the cross-section of the gas-flow channel being preferably a convex metric space, preferably a strict convex metric space, i.e. with no straight portions, most preferably of substantially circular, elliptical, or lensoid shape. The cross-section is specifically substantially non-rectangular and non-annular.

It is to be understood that the mixing and injection device may comprise more than one streamlined body of a specific length, e.g. two bodies of a specific length and two shorter bodies. As the gas-flow channel is convexly curved, bodies with a longer length along the first transverse direction are arranged closer to the center of the channel than shorter bodies, at least for arrangements, where the bodies are essentially straight and essentially parallel to one another with respect to their first transverse directions.

A convexly curved cross-section, in particular a substantially circular, elliptical, or lensoid cross-section is advantageous as it enhances the mechanical integrity of the mixing and injection device and as corners in this device are effectively avoided. The mixing of hot gas and fuel in the corners of a rectangular or a substantially rectangular cross-section can lead to inhomogeneous mixtures in the corners. Hence it is beneficial to use a convexly, i.e. outwardly curved gas flow-channel.

The streamlined profile of a body, as given by a cut through the streamlined body, the cut being essentially perpendicularly to the first transverse direction, i.e. substantially along the main-flow direction, is an aerodynamic profile that typically comprises a leading edge with a rounded leading edge region and that extends with the lateral surfaces to the trailing edge. A width distribution of said profile, i.e. the minimal distance between the two lateral surfaces of the profile, has a maximum width that is preferably located closer to the leading edge than to the trailing edge of said body. The width essentially continuously diminishes downstream of the maximum width towards the trailing edge. Some portions of the profile may, however, have a constant width. The trailing edge either forms a sharp edge or rounded edge.

In one embodiment a rear section, i.e. a downstream portion of the streamlined body, has a constant thickness distribution. The rear section with the constant thickness distribution extends, for example, over at least 30% of the profile length (against the main-flow direction) from the trailing edge. In a further embodiment the rear section with constant thickness distribution extends over 50% or over even up to 80% of the profile length.

A further preferred embodiment is characterized in that the streamlined body comprises an essentially straight leading edge. The leading edge may however also be rounded, bent or slightly twisted.

According to a preferred embodiment, each of a plurality of streamlined bodies is provided with a plurality of nozzles at or in the trailing edge for in-line injection of fuel jets. Hence, multi-point injection is proposed. This multi-point injection is beneficial for upscaling the SEV-concept to cylindrical symmetry, e.g. of a can combustor. The basic idea consists of having each injector or body with an independent fluid-dynamic structure (lobes and/or vortex generators, see below) ensuring the required mixing in the available mixing length. These elements can then be repeated in the first transverse direction with further lobes and/or vortex generators on the same body and in the second and/or third transverse direction (see below) by transversely neighboring streamlined bodies in order to best fit the cylindrical shape. With the multipoint injection system, injection elements can therefore be added "at will" to fit a new cross-sectional area/shape. A round cross-section of the burner or gas-flow channel is particular advantageous for better mechanical integrity (e.g. creep resistance), manufacturability and to maintain a homogeneous flow structure expanding into the sequential liner.

According to a particularly preferred embodiment, at least one of said streamlined bodies is provided with the mixing structure in form of a plurality of lobes located at the trailing edge of said body. The lobes are extending substantially perpendicularly to said central plane between the lateral surfaces, i.e. they are extending laterally away from the lateral surface, in a second transverse direction or a third transverse direction, depending on which lateral surface they are provided on. The second and third transverse directions run essentially oppositely to one another and perpendicularly to the first transverse direction.

According to a preferred embodiment, a transition in downstream direction from the leading edge region to the lobes is smooth with a surface curvature representing a function with a continuous first derivative. Here, preferably, a transverse displacement of the streamlined body, forming the lobes, is only at most in the downstream two thirds of the length of the body, more preferably only in the downstream half of the length of the body.

Neighboring lobes on the same trailing edge alternatingly extend out of the central plane, i.e. in the transverse direction with respect to the central plane. The shape can be a sequence of semi-circles, sectors of circles; it can be in a sinus or sinusoidal form. The shape may also be in the form of a combination of sectors of circles or sinusoidal curves and adjunct straight sections, where the straight sections are asymptotic to the curves or sectors of circles. Preferentially, all lobes are of essentially the same shape along the trailing edge.

The lobes are arranged adjacent to each other so that they form an interconnected trailing edge line. Lobe angles should be chosen in such a way that flow separation is avoided. According to one embodiment the lobe angles are between 15° and 45°, preferably between 25° and 35° to avoid flow separation.

According to a preferred embodiment, the lobing trailing edge is provided over essentially its entire length with lobes, wherein the lobes are sequentially arranged, one adjacent to the next, along the trailing edge. The lobes are alternatingly lobing in the second and third transverse directions, preferably with a lobe wave length that ranges from and includes 20 Millimeters to 100 Millimeters, preferably from 30 Millimeters to 60 Millimeters. It is preferred that all streamlined bodies of the mixing an injection device are provided with one and the same lobe wave length.

Depending on the shape of the cross-section of the flow-channel the length (in the first transverse direction) of the lobed bodies may differ from one another by about 10% to about 50% or more of the length of the longer one, i.e. one body may have only half the length of a longer one.

According to a preferred embodiment, a lobe height, defined as the distance perpendicular to the central plane between apexes of adjacent lobes of the same body, ranges from and includes 5 Millimeters to 60 Millimeters and is e.g. about 10, 25, or 50 Millimeters. The lobe height is the peak-to-peak amplitude of the lobing trailing edge.

The lobe height is preferably at least half of the maximum width of the streamlined profile. According to one particularly preferred embodiment, this height is approximately the same as the maximum width of the streamlined body. According to another particular preferred embodiment, the lobe height is approximately twice the maximum width of the streamlined body. Generally speaking, preferably, the height is at least as large as the maximum width, preferably not more than three times as large as the maximum width.

According to a particularly preferred embodiment a ratio of the lobe height to a minimal diameter of the gas-flow channel ranges from and includes 1:4 to 1:20, preferably from and includes 1:5 to 1:10.

According to a further preferred embodiment, the transverse displacement of the streamlined body that forms the lobes is only at most in the downstream two thirds of the length (measured along the main-flow direction) of the streamlined body. This means that the upstream portion the streamlined body has an essentially symmetric shape with respect to the central plane. Downstream thereof the lobes are continuously and smoothly growing into each transverse direction forming a wavy shape of the sidewalls of the streamlined body where the amplitude of this wavy shape is increasing to a maximum value at the trailing edge.

According to yet another preferred embodiment, the lobing trailing edge meets the limiting wall under an entrance angle that is in a range from and includes 70 degrees to 110 degrees, more preferably from and includes 80 degrees to 100 degrees, and is in particular about or exactly 90 degrees. The entrance angle is the angle that is formed between a tangent plane to the trailing edge and a tangent plane to the limiting wall, both planes being in the point where wall and trailing edge meet one another and both planes being parallel to the longitudinal axis of the flow-channel. The entrance angle is important to allow the formation of a vortex around the lobe which meets the limiting wall. Preferably the lobbing towards the limiting wall, i.e. the distance perpendicular to the central plane, at the location where the lobe intersects with the limiting wall is at least 15% of the lobe height, preferably is 20 to 50% of the lobe height According to another particularly preferred embodiment, at least one of said streamlined bodies is provided with the mixing structure in form of at least two vortex generators located at least at one of its lateral surfaces, between the leading edge and the trailing edge. Each vortex generator extends over its vortex generator height substantially perpendicularly to said central plane. The vortex generator height is thus measured from the central plane to the apex of the vortex generator.

Preferably such a vortex generator has an attack angle in the range of 15-20° and/or a sweep angle in the range of 55-65°.

The vortex generator attack angle may depend, like the lobe height, on the actual diameter of the combustor chamber, the number of streamlined bodies. Preferably, the vortex generators are located at the two lateral surfaces in an alternating manner with fuel nozzles, wherein, preferably, downstream of each vortex generator there are located at least two of said fuel nozzles. According to a preferred embodiment, a minimal transversal distance from the vortex generator to the limiting wall is in a range from and includes 20% to 40% of said vortex generator height, wherein said distance is preferably ⅓ of the vortex height. A distance between adjacent flutes, i.e. streamlined bodies, is preferably about twice said minimal transversal distance of a vortex generator to the wall or it is about twice the average distance between the body and the wall of the outermost body in a parallel body-arrangement. Preferably, the distance between adjacent bodies is at least ¹/₁₀₀ of and more preferably at least ¹/₁₅ of the burner diameter, i.e. the maximal diameter of the gas-flow channel.

A specific objective of the invention is to provide a substantially cylindrical burner with improved mixing. This object is achieved by providing a burner, in particular (but not exclusively) for a secondary combustion chamber of a gas turbine with sequential combustion, having a first and a second combustion chamber, with an injection device for the introduction of at least one gaseous and/or liquid fuel into the burner, wherein the injection device has at least two bodies, which is arranged in the burner with at least one nozzle for introducing the at least one fuel into the burner. The at least one body is configured as a streamlined body, which has a streamlined cross-sectional profile and which extends with a longitudinal direction perpendicularly or at an inclination to a main flow direction prevailing in the burner. The at least one nozzle has its outlet orifice at or in a trailing edge (or somewhat downstream of the trailing edge) of the streamlined body.

According to one embodiment, such a streamlined body is formed such that, with reference to a central plane of the streamlined body, the trailing edge is provided with at least two lobes in opposite transverse directions. In other words the trailing edge does not form a straight line but a wavy or sinusoidal line, where this line oscillates around the central plane.

According to another embodiment, the streamlined body is provided, at its lateral surface(s) with vortex generators, as described above, wherein the trailing edge may be a straight edge or may be lobed as described above.

The present invention involves injection of fuel at the trailing edge of the injectors. The fuel injection is preferably along the axial direction, which eliminates the need for high-pressure carrier air (MBH70 air). The invention is robust for broad ranges of momentum flux ratio (carrier air or fuel velocities) and allows fuel-air mixing with low momentum flux ratios being possible. An inline fuel-injection system includes number of lobed flutes or flutes with vortex generators or lobed flutes with vortex generators, the flutes being staggered to each other, preferably in a parallel configuration. The injection of fuel substantially in main-flow direction is advantageous for fuel capability, as different fuel types require different injection velocities in the case of cross-injection. This is because for good mixing it has to be ensured, that the fuel jet penetrates the gas vortices created before the fuel injection. This requires high-pressure carrier air for cross-injection. According to the present invention, the vortices are created together with the injection or around the fuel jet, so that the fuel jet is integrated in the gradually developing vortex. Hence, the fuel does not need high-pressure carrier air but may be injected with low-pressure carrier air. This low-pressure carrier air then further serves for cooling purposes of the fuel. The burner can therefore be used for fuel-air mixing as well as mixing of fuel with any kind of gas used in closed or semi-closed gas turbines or with combustion gases of a first combustion stage.

The burner can be used for gas turbines comprising one compressor, one combustor and one turbine as well as for gas turbines with one or multiple compressors, at least two combustors and at least two turbines. They can for example be used as premix burners in a gas turbine with one combustor or also be used as a reheat combustor for a secondary combustion chamber of a gas turbine with sequential combustion having a first and a second combustion chamber, with an injection device for the introduction of at least one gaseous and/or liquid fuel into the burner.

A lobe periodicity ("wave length") is preferentially in the range from 5% to 50% of the diameter. Preferably, there are at least 5 to 8 lobes distributed equidistantly along the trailing edge of the longest streamlined body, wherein, preferably, the number of lobes is reduced proportionally according to the reduction in length for the shorter streamlined bodies. Streamlined bodies of different lengths along the first transverse direction may have a different number of lobes.

According to yet another preferred embodiment, a plurality of fuel nozzles are located at along the trailing edge (or in the trailing edge) and distributed preferably in equidistant manner. Bodies of different length may have a different number of fuel nozzles.

According to yet another preferred embodiment, the fuel nozzles are located essentially on the central plane of the streamlined body (so typically not in the lobed portions of the trailing edge). In this case, a fuel nozzle is preferably located at each position or every second position along the trailing edge, where the lobed trailing edge crosses the central plane.

According to yet another embodiment, the fuel nozzles are located essentially at the apexes of lobes, wherein preferably a fuel nozzle is located at each apex or every second apex along the trailing edge.

Hence, the distance between nozzles may be equal to the lobe wave length or it may be a multiple or fraction of it.

The distance between nozzles ranges from and includes 5 Millimeters to 150 Millimeters, preferably ranges from 10 Millimeters to 120 Millimeters, wherein a nozzle may preferably have a distance to the limiting wall, which is about 30% to 100%, preferably about 50% of the distance between two nozzles.

The nozzles, in particular the nozzles close to the limiting wall, may be slightly tilted so as to inject the fuel jet away from the wall towards a close vortex. A nozzle may therefore inject fuel and/or carrier gas at an inclination angle ranging from and including 0 to 30° with respect to the main-flow direction. Also inclination angles up to 60° are possible.

The distance between nozzles for bodies with no lobes but a plurality of vortex generators may be the same as in the described in the context of a lobed trailing edge.

Typically the limiting wall is an essentially planar wall structure, which can be converging towards the exit side. In particular (but not only) the limiting wall be lobed or provided with vortex generators, i.e. the limiting wall can have an undulated surface facing the gas-flow channel. This undulation can, even more preferably, have essentially the same characteristics as the one of the injectors, i.e. the undulation can in particular be inverted to the undulation of neighboring streamlined bodies, i.e. the may be arranged out of phase with the undulations (i.e. the lobes and/or vortex generators) of the injector(s). It may also have essentially the same height of the undulations as the height of the lobes or the vortex generators of the injectors. The circumference of the cross-section of the undulated limiting wall may be a multiple of the wave length of the lobes or vortex generators.

According to one embodiment with vortex generator and/or lobes as described above, a plurality of fuel nozzles are distributed along the trailing edge, wherein the fuel nozzles are circular and/or are elongated slot nozzles extending along the trailing edge of the streamlined body and/or comprise a first nozzle for injection of liquid fuel, and/or a second nozzle for injection of a gaseous fuel and a third nozzle for injection of carrier air, which encloses the first nozzle and/or the second nozzle.

According to another preferred embodiment, at least two nozzles have their outlet orifices downstream of the trailing edge of the streamlined body, wherein preferentially the distance between the essentially straight trailing edge at the position of the nozzle, and the outlet orifice of said nozzle, measured along the main-flow direction, is at least 2 Millimeters, preferably at least 3 Millimeters, more preferably in the range from about 4 Millimeters to about 10 Millimeters.

According to another preferred embodiment, at least two fuel nozzles are located at the trailing edge and distributed along the trailing edge, and wherein the fuel nozzles are located essentially on the central plane of the streamlined body, wherein preferably at each position, where the lobed trailing edge crosses the central plane, there is located a fuel nozzle.

According to a preferred embodiment, the streamlined bodies extend from the first region of the limiting wall through the gas-flow channel to a second region of the limiting wall, i.e. the streamlined body extends across the entire flow channel cross-section between opposite wall portions of the burner. Preferably, the streamlined bodies extend essentially straightly between the regions through the channel. Preferably, a tangent plane to the first region and/or the second region of the limiting wall and the bodies' lengthwise direction along the first transverse direction are inclined with respect to one another.

According to particularly preferred embodiments, the streamlined bodies are arranged with their lengthwise extension along the first transverse direction essentially parallel to one another, wherein the lobes generators of nearest neighbouring streamlined bodies, if any, are arranged in-phase (i.e. the apexes of nearest transversal neighbour lobes generators point in the same direction) or out-of-phase (i.e. said apexes point against one another).

According to a further particularly preferred embodiment, the streamlined bodies are arranged with their lengthwise extension along the first transverse direction essentially parallel to one another, wherein the vortex generators of nearest neighbouring streamlined bodies, if any, are arranged out of in-phase (i.e. the apexes of nearest transversal neighbour vortex generators point in the same direction).

It has been found that inverting the traverse deflection from the central plane of two adjacent lobed bodies, which form the lobes, is particularly advantageous for efficient and fast mixing. In other words, the periodic deflections from two adjacent streamlined bodies are out of phase: at the same position in longitudinal direction the deflection of each body has the same absolute value but is in opposite direction. Further, to minimize the pressure drop and to avoid any wakes the transition from a planar leading edge region to the deflections is smooth with a surface curvature representing a function with a continuous first derivative.

Preferentially, downstream of said body (typically downstream of a group of for example three or four of such bodies located within the same burner) a mixing zone is located, and at and/or downstream of said body the cross-section area of said mixing zone is reduced, wherein preferably this reduction is at least 10%, more preferably at least 20%, even more preferably at least 30% or 50% to 75% or more, compared to the flow cross-section upstream of said body. Typically, at least one preferably a plurality of nozzles injects fuel (liquid or gas) and/or carrier gas parallel to the main flow direction. At least one nozzle may however also inject fuel and/or carrier gas at an inclination angle of normally not more than 30° with respect to the main flow direction.

Further, preferably the burner is a burner comprising at least two, preferably at least three or four streamlined bodies, the longitudinal axes of which are arranged essentially parallel to one another. The streamlined bodies can be arranged in the burner such that a straight line connecting the trailing edge to a leading edge extends parallel to the main flow direction of the burner. Preferably, however, the streamlined bodies are slightly inclined with respect to the main-flow direction, i.e. they are not arranged fully parallel with the main flow direction but are converging towards the downstream following mixing zone. The further away from the center of the gas-flow channel, the more the streamlined bodies may be inclined. This in particular, if the mixing zone has the same converging shape.

According to a preferred embodiment, the body is provided with cooling elements, wherein preferably these cooling elements are given by internal circulation of cooling medium along the sidewalls of the body (i.e. by providing the bodies with a double wall structure) and/or by film cooling holes, preferably located near the trailing edge, and wherein most preferably the cooling elements are fed with air from the carrier gas feed also used for the fuel injection. For a gas turbine with sequential combustion, preferably the fuel is injected from the nozzle together with a carrier gas stream, and the carrier gas air is low pressure air with a pressure in the range from 10 bar to 35 bar, preferably in the range from 16 bar to 25 bar.

As mentioned above, it is preferred if streamlined body has a cross-sectional profile which, in the portion where it is not lobed, is minor symmetric with respect to the central plane of the body for application with axial inflow.

A plurality of separate outlet orifices of a plurality of nozzles can be arranged next to one another and arranged at or in the trailing edge. At least one slit-shaped outlet orifice can be, in the sense of a nozzle, arranged at the trailing edge. A split-shaped or elongated slot nozzle is typically arranged to extend along the trailing edge of the streamlined body.

The nozzles can comprise multiple outlet orifices for different fuel types and carrier air. In one embodiment a first nozzle for injection of liquid fuel or gas fuel, and a second nozzle for injection of carrier air, which encloses the first nozzle, are arranged at the trailing edge.

In another embodiment a first nozzle for injection of liquid fuel, a second nozzle for injection of a gaseous fuel, which encloses the first nozzle, and a third nozzle for injection of carrier air, which encloses the first nozzle, and the second nozzle, are arranged at the trailing edge.

The present invention allows reduced pressure losses by an innovative injector design. Lobes and/or vortex generators can be shaped to produce appropriate flow structures such as vortices into which fuel is injected with low-pressure carrier air that also acts as cooling medium for the fuel. Intense shear of the vortices helps in rapid mixing and avoidance of low velocity pockets. The convexly curved limiting wall further reduces the risk of such pockets. An aerodynamically favored injection and mixing system reduces the pressure drop even further. Due to only having one device (injector) rather than the separate elements like: i) large-scale mixing device at the entrance of the burner, ii) vortex generators on the injector, and iii) injector pressure is saved. The savings can be utilized in order to increase the main flow velocity, which is beneficial if it comes to fuel air mixtures with high reactivity or can be utilized to increase the gas turbine performance.

Further, the concept of in-line fuel injection right at the location where the vortices are generated allows for the design of the cooling air passage to be simplified, as the fuel does not require momentum from high-pressure carrier air anymore.

If the above described cooling is used, the overall gas-turbine efficiency increases. The cooling air bypasses the high pressure turbine, but it is compressed to a lower pressure level compared to normally necessary high-pressure carrier air and requires less or no cooling.

One of the gists of the invention here is to merge the vortex generation aspect by means of lobes or vortex generators and the fuel injection device as conventionally used e.g. in can combustors according to the state-of-the-art as a separate elements (separate structural vortex generator element upstream of separate fuel injection device) into one single combined vortex generation and fuel injection device. By doing this, mixing of fuels with oxidation air and vortex generation take place in very close spatial vicinity and very efficiently, such that more rapid mixing is possible and the length of the mixing zone can be reduced. It is even possible in some cases, by corresponding design and orientation of the body in the oxidizing air path, to omit the flow conditioning elements (turbine outlet guide vanes) as the body may also take over the flow conditioning. All this is possible without severe pressure drop along the injection device such that the overall efficiency of the process can be maintained or improved. The invention targets towards accomplishing fuel-air mixing within short mixing lengths in burners with cylindrical cross-sections, it aims at burning of fuel-air mixtures with a short ignition delay time.

According to another preferred embodiment, the mixing and injection device acts as a flow straightener by being provided at the leading edge of each streamlined body with a profile, which is oriented parallel to the main-flow direction prevailing at the leading edge position. Streamlined bodies with a combination of a leading edge area with an aerodynamic profile for flow straightening and with a lobed trailing edge for mixing is especially advantageous for mixing of flows with an inhomogeneous flow profile at the inlet area. Without the flow straightening the turbulent dissipation pattern created by the lobes is disturbed and only partial mixing takes place.

A flow, which is practically parallel to the longitudinal axis of the flow-channel, which is aligned with the central plane of the lobed section of the streamlined body, is advantageous to optimize the flow conditions for the mixing. To guide the flow in the parallel direction the leading edge region of the streamlined body has an aerodynamic profile, which is turning from an inclined orientation relative to the longitudinal axis of the flow straightener and mixing device, to an orientation, which is parallel to the longitudinal axis of flow straightener and mixing device. This change in orientation preferably takes place in the upstream half of the streamlined body.

In order to allow capability for highly reactive fuels, the injector is designed to perform flow conditioning (at least partial), injection, and mixing in a can combustor simultaneously. As a result, the injector can save burner pressure loss, which is currently utilized in the various devices along the flow path. If the conventional combination of flow conditioning device, vortex generator and injector is replaced by the proposed invention, the velocity of the main flow can be increased in order to achieve a short residence time of the fuel air mixture in the mixing zone.

Besides an improved burner comprising the mixing and injection device, a method for operation of such a burner is an objective of the invention. Depending on the operating conditions and load point of a gas turbine, the fuel flow injected through a burner varies in a wide range. A simple operation where the flow is equally distributed to all burner nozzles and the flow through each nozzle is proportional to the total flow can lead to very small flow velocities at individual nozzles impairing the injection quality and penetration depth of the fuel into the air flow.

According to one preferred embodiment of the operating method according to invention, the number of fuel injection nozzles through which fuel is injected is determined as function of the total injected fuel flow, wherein, preferably, below a threshold fuel flow, fuel is only injected through every second fuel nozzle of a streamlined body and/or that fuel is only injected through the fuel nozzles of every second or third streamlined body of the burner.

According to another embodiment of the operating method the number of fuel injection nozzles through which fuel is injected is determined as function of the total injected fuel flow in order to assure a minimum flow in the operative nozzles.

In yet another embodiment, the fuel is injected through every second fuel nozzle of a vane at low fuel flow rates. Alternatively, the fuel is only injected through the fuel nozzles of every second or third vane of the burner. Further, the combination of both methods to reduce fuel injection is suggested: For low fuel mass flows the fuel is injected through every second or third fuel nozzle of a vane and only through the fuel nozzles of every second or third vane of the burner is proposed. At an increased mass flow the number of vanes used for fuel injection and then the number of nozzles used for fuel injection per vane can be increased. Alternatively, at an increased mass flow the number of nozzles used for fuel injection per vane can be increased and then the number of vanes used for fuel injection and can be increased. Activation and deactivation of nozzles can for example be determined based on corresponding threshold fuel flows.

The burner according to invention may be used for example in Alstom's GT24 and GT26 as well as in an arrangement as described in DE 103 12 971 A1 or for example in the WO2012/136787.

They can be used in any other gas turbine arrangement.

Further embodiments of the invention are laid down in the dependent claims.

BRIEF DESCRIPTION OF THE DRAWINGS

Preferred embodiments of the invention are described in the following with reference to the drawings, which are for the purpose of illustrating the present preferred embodiments of the invention and not for the purpose of limiting the same. In the drawings, FIG. 1 shows a known SEV burner with separate mixing and injection element;

FIG. 2 shows a known SEV burner located downstream of the high-pressure turbine together with the fuel mass fraction contour (right side) at the exit of the burner;

FIG. 3 shows a SEV burner with a cylindrical combustion chamber and a mixing and injector device with a circular limiting wall according to invention;

FIG. 4 shows the mixing and injection device according to FIG. 3;

FIG. 6 shows in a) a schematic perspective view onto a lobed streamlined body and the flow paths generated on both sides and at the trailing edge thereof, and in b) a side elevation view thereof;

FIG. 7 shows in a) a front view and in b) a perspective view of a plurality of bodies of a burner according to FIG. 3, wherein the bodies are not lobed but are provided with vortex generators, and in c) a schematic sketch how the attack angle and a sweep angle of the vortex generator are defined, wherein in the upper representation a side elevation view is given, and in the lower representation a view onto the vortex generator in a direction perpendicular to the plane on which the vortex generator is mounted are given;

DETAILED DESCRIPTION

Figure 5:
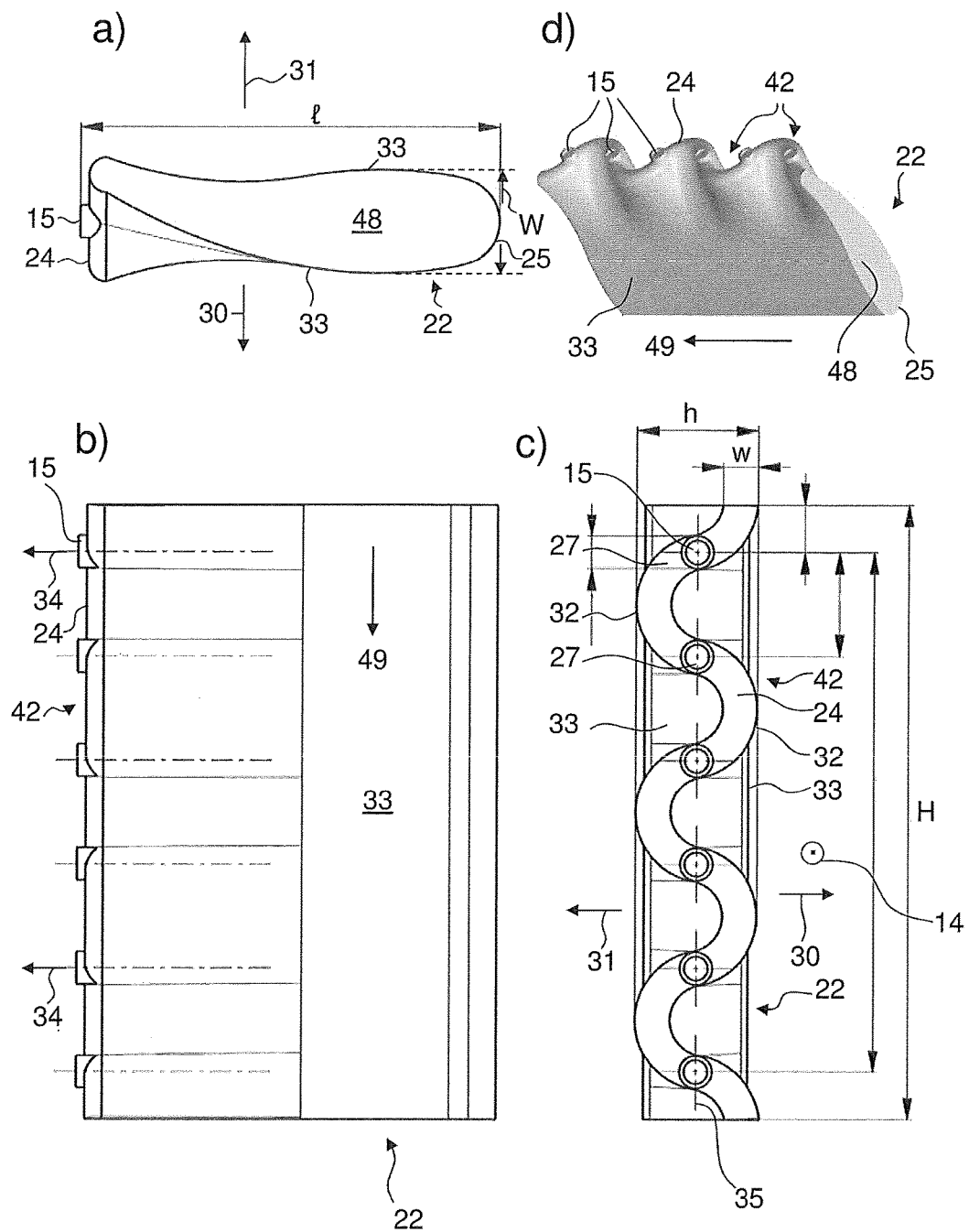
FIG. 5 shows a lobed flute, wherein in a) a cut perpendicular to the longitudinal axis is shown, in b) a side view, in c) a view onto the trailing edge and against the main flow, and in d) a perspective view is shown.

FIGS. 1 and 2 show conventional secondary burners 111. The burner 111, which is an annular burner, is bordered by opposite walls 3. These opposite walls 3 define the flow space for the main gas flow of oxidizing medium in main-flow direction 14. This flow enters as a gas flow 8 from the high-pressure turbine, i.e. behind the last row of rotating blades of the high pressure turbine, which is located downstream of the first combustor. This gas flow 8 enters the burner at the inlet side 6. First, this gas flow 8 passes flow-conditioning elements 9, which are typically stationary turbine outlet guide vanes that bring the flow into the proper orientation. Downstream of these flow-conditioning elements 9, large premixing vortex generators 10 are located in order to prepare the gas for the subsequent mixing step. Downstream of the premixing vortex generators 10 there is provided an injection device or fuel lance 7, which typically comprises a stem or foot 16 and an axial shaft 17. At the most downstream portion of the shaft 17 fuel injection takes place. Fuel injection takes place via nozzles 15 that inject the fuel perpendicularly to the main-flow direction 14 (cross-flow injection).

Downstream of the fuel lance 7 there is the mixing zone 2, in which the air, bordered by the two walls 3, mixes with the fuel during a residence time $t_1$ and then at the outlet side 5 exits into the combustion space 4a where, after the self-ignition time $t_2$, self-ignition takes place. The self-ignition time $t_2$ is the time it takes from fuel injection to self-ignition. The burning gas mixture reacts during a reaction time $t_3$.

At the transition between the mixing zone 2 to the combustion space 4a there is typically a transition 13, which may be in the form of a step (FIG. 1) or of round edges (FIG. 2) and also with stall elements for the flow. The transition 13 and the combustion process cause a part of the hot gas to recirculate in recirculation zone 4a. The combustion space is bordered by the combustion chamber wall 12. In case of burner 111 according to FIG. 2a, this leads to a fuel mass fraction contour 11 at the burner exit 5 as indicated in FIG. 2b.

FIG. 3 shows a burner 1 according to invention with a mixing and injection device 43. The injection device 43 comprises an essentially circular limiting wall that defines the gas-flow channel 440. Said cylindrical channel 440 has a longitudinal axis 47 (see, e.q., FIG. 9), an inlet area 45, and, downstream thereof in a main-flow direction 14, an outlet area 46. The main-flow direction 14 points along the longitudinal axis 47. FIG. 3 shows a set-up, where the proposed burner area is reduced considerably in main-flow direction 14. Here, the reduced outlet area 46 is about 75% of the inlet area 45. This causes increased gas velocities in direction 14, which helps in operating the burner 1 safely at highly reactive conditions. Importantly, burner 1 according to FIG. 3 does not require premixing vortex generators 10 as shown in FIGS. 1 and 2. The vortices for mixing fuel and gas in the mixing zone that follows downstream of the bodies 22 are created directly with the fuel injection device 43.

FIG. 4 shows the mixing and injector device 43 according to FIG. 3 on its own. It can be seen that the bodies 22 extend each straightly from a first region 441 of the wall 44 (upper part in FIGS.3,4) to a second region 442 of the wall 44 (lower part in FIGS. 3,4) across the gas-flow channel 440. Here, the two inner bodies 22 have the same length (along the first transverse direction 49), wherein the outer bodies 22 have a length that is about ⅔ of the length of the inner bodies 22.

The bodies 22 extend through the limiting wall 44 and protrude partially over an outer surface of the injection device 43. Through these protruding portions of the bodies 22, the portions not have any lobing or vortex generator, fuel and carrier gas may be fed into burner 1. As can be seen from FIG. 4, the trailing edge 24 of the streamlined bodies 22 are provided with lobes 28, 29. The lobes 28, 29 of transversely neighboring bodies 22 are lobing out-of-phase, i.e. apexes of lobes 28, 29 pointing in a second or a third transverse direction 30, 31 are either pointing against one another or in opposite transverse directions. The second and third transverse directions 30, 31 are perpendicular to the main-flow direction 14, perpendicular to the first transverse direction 49, and antiparallel to one another. In FIG. 4 the vortices around each nozzle 15 are indicated (as semicircular arrow). The vortices close to the limiting wall 44 are indicated with solid lines, whereas the vortices in the burner, which are not influenced by the limiting wall 44 are indicated with dotted lines. From this Figure it becomes clear that a sufficient entrance angle y is required to allow vortex formation next to the limiting wall. Further sufficient height of the lobe at the intersection to the limiting wall 44 is required to allow vortex formation.

The lobed trailing edge 24 of each body 22 meets the limiting wall 44 in regions 441 and 442 under an entrance angle γ of 90°.

FIG. 5 shows the basic design resulting in a flute like injector, i.e. a lobed streamlined body 22. The body 22 can be part of a burner 1, as already described elsewhere. The main flow is passing the lobed mixer 43, resulting in velocity gradients. These result in intense generation of shear layers, into which fuel can be injected. The lobe angles $\alpha_1$ and $\alpha_2$ (cf. FIG. 6) are chosen in such way to avoid flow separation.

More specifically, the streamlined body 22 is configured as flute 22, which is illustrated in a cut in FIG. 5a, in side view in FIG. 5b, in a view onto the trailing edge against the main flow direction 14 in 5c and in a perspective view in FIG. 5d.

The streamlined body 22 has a leading edge 25 and a trailing edge 24. The leading edge 25 defines a straight line and in the leading edge portion of the shape the shape is essentially symmetric, so in the upstream portion 48 the body has a rounded leading edge and no lobing.

The leading edge 25 extends along the longitudinal axis 49 of the flute 22. Downstream of this upstream section the lobes successively and smoothly develop and grow as one goes further downstream towards the trailing edge 24. In this case the lobes are given as half circles 32 sequentially arranged one next to the other alternating in the two opposite directions along the trailing edge, as particularly easily visible in FIG. 5c.

At each turning point 27 which is also located on the central plane 35, there is located a fuel nozzle 15 which injects the fuel in an injection direction 34 inline, so essentially along the main flow direction 14. In this case the trailing edge is not a sharp edge but has width W, which is for example in the range of 5 Millimeters to 10 Millimeters. The maximum width W of the body 22 is in the range of 25 Millimeters to 35 Millimeters and the total height h of the lobing is only slightly larger than this width W.

A streamlined body for a typical burner in this case has a height H in the range of 100 Millimeters to 200 Millimeter. The periodicity (lobe wave length λ) is around 40 Millimeters to 60 Millimeters.

The lobed mixing concept is described with reference to FIG. 6, which shows the flow conditions along a lateral surface 33 of a streamlined body 22. The central plane 35 of which is arranged essentially parallel to the main-flow direction 14, which flow has a straight leading edge 38 and a lobed trailing edge 39. The gas flow 14 at the leading edge 38 develops a flow profile 40, as indicated schematically with arrows.

The lobed structure 42 at the trailing edge 39 is progressively developing downstream the leading edge 38 to a wavy shape with lobes going in the second transverse direction 30, which is transverse to the central plane 35 and to the main-flow direction 14. Lobes extending in the second transverse direction 30 are designated with the reference numeral 28. Lobes extending into the third transverse direction 31, i.e. opposite to direction the second transverse direction 30, are designated with reference numeral 29. The lobes alternate in the two transverse directions 30, 31. Wherever the lobes or rather the line/plane forming the trailing edge pass the central plane 35, there is a turning point 27.

As one can see from the arrows indicated in FIG. 6a, the airflow flowing in the channel-like structures on the upper face and the airflows in the channels on the lower face intermingle and start to generate vortices 41 downstream of the trailing edge 39, leading to an intensive mixing.

The lobed structure 42 is defined by the following parameters: i) the periodicity (i.e. the lobe wave length λ) gives the width of one period of lobes in a direction perpendicular to the main-flow direction 14; ii) the lobe height $h_1$, i.e. the distance in a direction perpendicular to the main-flow direction 14, so along the directions 30 and 31, between adjacent apexes of adjacent lobes as defined in FIG. 6b; and iii) the first lobe angle $\alpha_1$ (the first elevation angle), which defines the displacement into the first direction of the lobe 28, and the second lobe angle $\alpha_2$ (second elevation angle), which defines the displacement of lobe 29 in the direction 31. Typically $\alpha_1$ is identical to $\alpha_2$. The height of the lobes from the lobed trailing edge 39 to the central plane 35 is indicated $h_2$ (see FIG. 9).

To ensure good mixing, a flow field with turbulent dissipation is induced over the complete cross section of the flow path by arranging two or more streamlined bodies 22 in the flow path. Lobes of transversely neighboring bodies 22, which are arranged out-of-phase (phases of lobe periodicity shifted by 180°) lead to a further improved mixing as compared to lobes that are arranged in-phase.

The vortex generator mixing concept works quite similar.

FIG. 7 shows schematically in a) a front view and in b) a perspective view of other embodiments of the mixing and injector device 43 according to invention. The difference between FIG. 7a and FIG. 7b is the arrangement of vortex generators 60 and nozzles 15. In FIG. 7a, the limiting wall 44 defines gas-flow channel 440 with a substantially elliptical cross-section. The main-flow direction 14 is indicated. The device injection 43 houses three parallel aligned streamlined bodies 22 that each extend straightly along the first transverse direction 49, from their first region 441 of limiting wall 44 to the second region 442 of the wall 44. The bodies are provided on their lateral surfaces 33 with vortex generators 60. In In FIG. 7 a fuel nozzle 15 is assigned to each vortex generator 60, wherein the nozzles 15 are provided on the straight trailing edge 24 and the vortex generators 60 alternatingly on the lateral surfaces 33 of the bodies 22.

The vortex generator attack and sweep angles are chosen to produce highest circulation rates at a minimum pressure drop. Normally such vortex generators have an attack angle α in the range of 15-20° and/or a sweep angle β in the range of 55-65°, for a definition of these angles reference is made to FIG. 7c), where for an orientation of the vortex generator in the gas flow 14 as given in FIG. 7a) the definition of the attack angle α is given in the upper representation which is an elevation view, and the definition of the sweep angle β is given in the lower representation, which is a top view onto the vortex generator.

FIG. 8 shows views against the main flow onto the trailing edge 24 of lobed flutes or bodies 22 with different nozzle arrangements. FIG. 8a shows an arrangement where first nozzles 51 for injection of liquid fuel, are enclosed by second nozzles 52 for injection of a gaseous fuel, which themselves are encloses by third nozzles 53 for injection of carrier air. The nozzles 51, 52, 53 are arranged concentrically at the trailing edge. Each nozzle arrangement is located where the lobed trailing edge crosses the center plane 35.

FIG. 8b shows an arrangement where second nozzles 52 for fuel gas injection are configured as a slit-like nozzle extending along the trailing edge each at each apex section of the lobes. Additionally first nozzles 51 for liquid fuel injection arranged at each location where the lobed trailing edge crosses the center plane 35. All the first and second nozzles 51, 52 are enclosed by third nozzles 53 for the injection of carrier air.

FIG. 8c shows an arrangement where a second nozzle 52 for fuel gas injection is configured as one slit-like nozzle extending along at least one lobe along the trailing edge.

For liquid fuel injection additional first nozzles 51 in the form of orifices are arranged in the second nozzles 52.

Figure 8D:
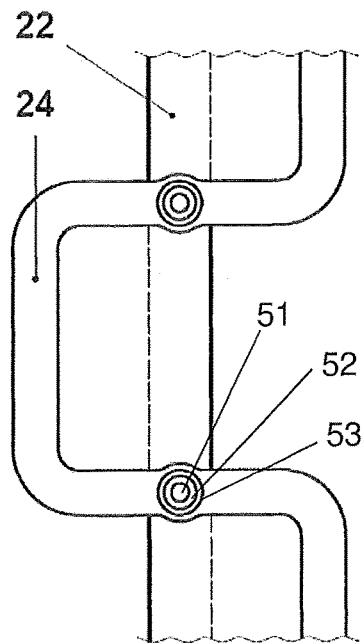
FIG. 8 shows the trailing edge of lobed flutes with different nozzle and lobe arrangements.
Figure 8E:
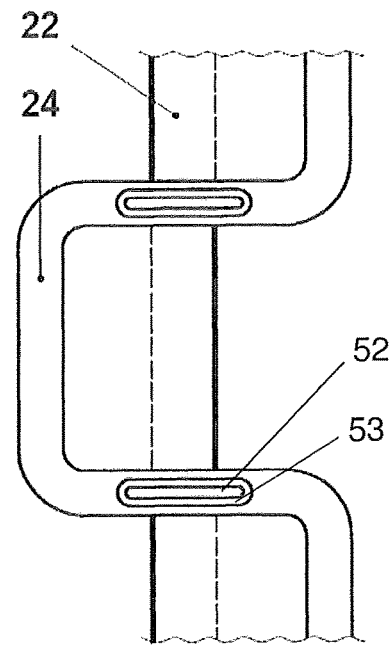

FIGS. 8d and 8e show. an arrangement where the lobe side walls comprise straight sections.

FIG. 8d shows an arrangement where first nozzles 51 for injection of liquid fuel, are enclosed by second nozzles 52 for injection of a gaseous fuel, which themselves are encloses by third nozzles 53 for injection of carrier air. The nozzles 51, 52, 53 are arranged concentrically at the trailing edge. Each nozzle arrangement is located where the lobed trailing edge crosses the center plane 35.

FIG. 8e shows an arrangement where second nozzles 52 for fuel gas injection are configured as a slit-like nozzle extending along the trailing edge. Each nozzle is enclosed by a third nozzle 53 for injection of carrier. All the first and second nozzles 52, 53 are enclosed by third nozzles 53 for the injection of carrier air. Additional first nozzles for liquid fuel injection can be provided but are not shown in this example.

Figure 9:
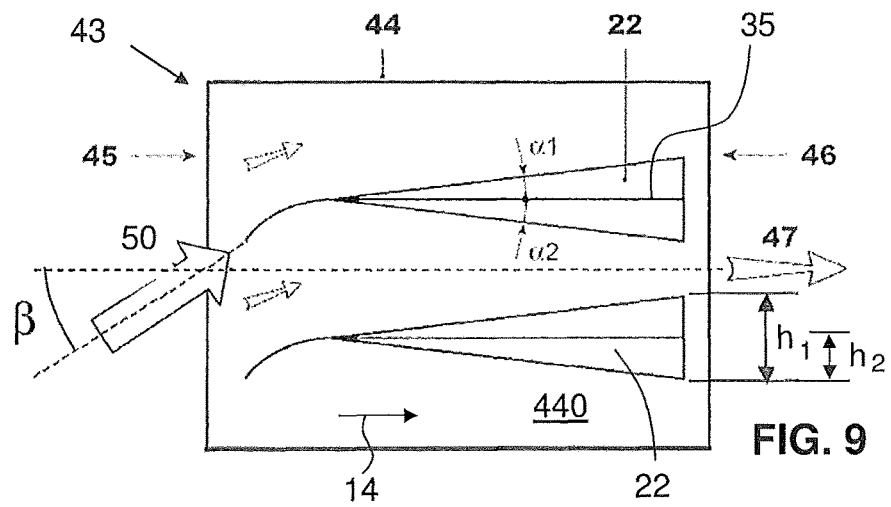
FIG. 9 shows a view of the mixing an injection device according to FIG. 3, acting as a flow straightener.

FIG. 9 shows schematically an embodiment of the mixing and injection device 43 with two bodies 22 that are provided with lobes and/or vortex generators as described above, and that are further provided, at their leading edge, with a straightener profile. The injection device 43 acts by means of these straightener profiles as a flow straightener. The main flow enters as inlet flow 50 the inlet area 45 of the gas-flow channel 440 under an inlet angle β with regard to the longitudinal axis 47. In the region of the inlet area, the inlet flow 50 is smoothly received by the straightener profiles, which are oriented in their upstream portion substantially parallel to inlet-flow direction. The straightener profiles then guide the main flow downstream and turn it smoothly in a direction substantially parallel to the longitudinal axis 47, whereupon the flow is guided along the lateral surfaces of the bodies 22 of the flow straightener and mixer 43, where gas vortices are created.

The invention claimed is:

1. A burner for a combustion chamber of a gas turbine, the burner comprising a mixing and injection device that includes:
   a limiting wall that defines a gas-flow channel with a longitudinal axis, an inlet area, and an outlet area downstream of the inlet area in a main-flow direction, wherein a cross-section of the gas-flow channel is circular, elliptical, or lensoid; and
   a plurality of streamlined bodies, each streamlined body extending in a first transverse direction from a first region of the limiting wall perpendicularly, or at an inclination, with respect to the main-flow direction to a second region of the limiting wall disposed on an opposite side of the gas-flow channel from the first region of the limiting wall,
   wherein each streamlined body has two lateral surfaces that are arranged substantially parallel to the main-flow direction with a central plane between the two lateral surfaces, the two lateral surfaces of each streamlined body being joined together so that each streamlined body has a leading edge and a trailing edge extending between the first and second regions of the limiting wall,
   wherein each streamlined body has a cross-section perpendicular to the first transverse direction that is shaped as a streamlined profile,
   wherein at least one streamlined body of said plurality of streamlined bodies includes a mixing structure and at least one fuel nozzle located at the trailing edge of the at least one streamlined body of said plurality of streamlined bodies for introducing at least one fuel substantially parallel to the main-flow direction and into the gas-flow channel, wherein the mixing structure comprises a plurality of lobes located along the trailing edge of the at least one streamlined body of the plurality of streamlined bodies,
   wherein a contour of the trailing edge of the at least one streamlined body of the plurality of streamlined bodies is defined by the plurality of lobes, and wherein the trailing edge at at least one of the lobes of the plurality of lobes is arranged at the limiting wall at an entrance angle of 70 degrees to 110 degrees,
   wherein at least two streamlined bodies of the plurality of streamlined bodies have different lengths with respect to each other along the first transverse direction between the first and second regions of the limiting wall such that a first streamlined body of the at least two streamlined bodies is longer in the first transverse direction than a second streamlined body of the at least two streamlined bodies between the first and second regions of the limiting wall, and wherein the first streamlined body is arranged sequentially in series with the second streamlined body.

2. The burner according to claim 1, wherein the plurality of lobes extend substantially perpendicularly to said central plane in a second transverse direction or a third transverse direction, wherein the second and third transverse directions are opposite to one another, and wherein a transition in a downstream direction from the leading edge to the plurality of lobes is substantially smooth.

3. The burner according to claim 1, wherein the plurality of lobes are arranged along an entire length of the trailing edge of the at least one streamlined body of the plurality of streamlined bodies, wherein the plurality of lobes are sequentially arranged along the trailing edge, and wherein the plurality of lobes are arranged in alternating directions.

4. The burner according to claim 2, wherein the streamlined profile of each streamlined body of the plurality of streamlined bodies has a width and a maximum width that is closer to the leading edge than to the trailing edge, wherein the width substantially continuously diminishes from the maximum width towards the trailing edge, and wherein a height of each lobe of the plurality of lobes, the height being defined as a distance perpendicular to the central plane between apexes of adjacent lobes of the plurality of lobes, ranges from 5 millimeters to 60 millimeters.

5. The burner according to claim 4, wherein a ratio of the height of each of the plurality of the lobes to a minimal diameter of the gas-flow channel is between 1:4 to 1:20.

6. The burner according to claim 1, wherein the the at least one streamlined body further comprises at least two vortex generators located at least at one of the two lateral surfaces, the at least two vortex generators being positioned between the leading edge and the trailing edge, each of the at least two vortex generators having a vortex generator height extending substantially perpendicularly to said central plane.

7. The burner according to claim 6, wherein the vortex generator height of each of the at least two vortex generators ranges from 10 millimeters to 50 millimeters.

8. The burner according to claim 6, wherein a minimal transverse distance from a first vortex generator of the at least two vortex generators to the limiting wall is in a range of 20% to 40% of said vortex generator height, or wherein a minimal transverse distance from the first vortex generator of the at least two vortex generators to a vortex generator of another streamlined body is in the range of 20% to 40% of said vortex generator height.

9. The burner according to claim 1, wherein a plane tangent to the first region is inclined with respect to a plane tangent to the second region.

10. The burner according to claim 2, wherein the plurality of streamlined bodies are substantially parallel to one another, wherein the at least one streamlined body comprises multiple streamlined bodies, and wherein lobes of adjacent streamlined bodies of the multiple streamlined bodies are lobed in-phase or out-of-phase.

11. The burner according to claim 1, wherein the plurality of streamlined bodies each include a flow straightener which is configured to redirect a flow entering the mixing and injection device.

12. The burner according to claim 2, wherein the plurality of lobes are arranged in a downstream two thirds of a length of the at least one streamlined body of the plurality of streamlined bodies.

13. The burner according to claim 2, wherein the plurality of lobes are arranged in a downstream half of a length of the at least one streamlined body of the plurality of streamlined bodies.

14. The burner according to claim 3, wherein the plurality of lobes each have a lobe wavelength ranging from 20 millimeters to 100 millimeters.

15. The burner according to claim 3, wherein the plurality of lobes each have a lobe wavelength ranging from 30 millimeters to 60 millimeters.

16. The burner according to claim 3, wherein all streamlined bodies of the plurality of streamlined bodies respectively comprise a plurality of lobes located along the trailing edge, and wherein all streamlined bodies of the plurality of streamlined bodies have a common lobe wavelength.

17. The burner according to claim 2, wherein each lobe of the plurality of lobes has a lobe height, a ratio of the lobe height to a minimal diameter of the gas-flow channel being in a range of 1:5 to 1:10.

18. The burner according to claim 2, wherein the entrance angle is between 80 degrees and 100 degrees.

19. The burner according to claim 6, wherein the at least one fuel nozzle comprises at least two fuel nozzles; and wherein:
a first vortex generator of the at least two vortex generators is located at a first lateral surface of the two lateral surfaces, a second vortex generator of the at least two vortex generators is located at a second lateral surface of the two lateral surfaces, the first vortex generator is aligned with a first fuel nozzle of the at least two fuel nozzles, the second vortex generator is aligned with a second fuel nozzle of the at least two fuel nozzles, and the first vortex generator and the second vortex generator are offset from each other along the first transverse direction; and/or
wherein:
the at least two fuel nozzles are located downstream of the at least two vortex generators.

20. The burner according to claim 6, wherein the at least one fuel nozzle is located downstream of the at least two vortex generators.

21. A method of operating the burner of claim 1, comprising
burning the at least one fuel, the at least one fuel comprising a fuel containing hydrogen.

22. A method for operating the burner of claim 1, the at least one fuel nozzle comprising at least three fuel nozzles, the method comprising:
injecting the at least one fuel only through every second fuel nozzle of the at least one streamlined body of the plurality of streamlined bodies when a fuel flow to the burner is below a threshold fuel flow.

23. A method for operating the burner of claim 1, the at least one streamlined body of the plurality of streamlined bodies comprising multiple streamlined bodies, the method comprising:
injecting the at least one fuel only through the respective at least one fuel nozzle of every second streamlined body of the multiple streamlined bodies or, alternatively, injecting the at least one fuel only through the respective at least one fuel nozzle of every third streamlined body of the multiple streamlined bodies.

24. A method for operating the burner of claim 1, the at least one fuel nozzle comprising a plurality of fuel nozzles, the at least one streamlined body comprising multiple streamlined bodies, the method comprising at least one of:

injecting the at least one fuel only through every second fuel nozzle of the plurality of fuel nozzles of each streamlined body of the multiple streamlined bodies when a fuel flow to the burner is below a threshold fuel flow, or injecting the at least one fuel through respective fuel nozzles of every second streamlined body of the multiple streamlined bodies when the fuel flow to the burner is below the threshold fuel flow or, alternatively, injecting the at least one fuel through respective fuel nozzles of every third streamlined body of the multiple streamlined bodies when the fuel flow to the burner is below the threshold fuel flow.

\* \* \* \* \*